(12) United States Patent
Weaver

(10) Patent No.: US 11,598,390 B1
(45) Date of Patent: Mar. 7, 2023

(54) FLYWHEEL

(71) Applicant: Joshua L. Weaver, Avon Lake, OH (US)

(72) Inventor: Joshua L. Weaver, Avon Lake, OH (US)

( * ) Notice: Subject to any disclaimer, the term of this patent is extended or adjusted under 35 U.S.C. 154(b) by 0 days.

(21) Appl. No.: 17/538,248

(22) Filed: Nov. 30, 2021

(51) Int. Cl.
*F16F 15/315* (2006.01)

(52) U.S. Cl.
CPC ........ *F16F 15/315* (2013.01); *F16F 2222/08* (2013.01); *F16F 2224/0208* (2013.01); *F16F 2230/46* (2013.01); *F16F 2232/02* (2013.01); *F16F 2236/08* (2013.01)

(58) Field of Classification Search
CPC .......... F16F 15/315; F16F 2222/08; F16F 2224/0208; F16F 2230/46; F16F 2232/02; F16F 2236/08
See application file for complete search history.

(56) References Cited

U.S. PATENT DOCUMENTS

| | | | |
|---|---|---|---|
| 4,478,593 | A | 10/1984 | Brown |
| 5,203,441 | A | 4/1993 | Monette |
| 5,299,880 | A | 4/1994 | Bouchard |
| 5,524,508 | A | 6/1996 | Peters |
| 5,566,591 | A | 10/1996 | Burkett |
| 2007/0137421 | A1 | 6/2007 | Reid |
| 2008/0210050 | A1 | 9/2008 | Prettyman |

FOREIGN PATENT DOCUMENTS

| | | | |
|---|---|---|---|
| CN | 111998037 A | * | 11/2020 |
| CN | 112709764 A | * | 4/2021 |
| CN | 112984049 A | * | 6/2021 |
| CN | 112984050 A | * | 6/2021 |
| CN | 113623338 A | * | 11/2021 |

* cited by examiner

*Primary Examiner* — Melanie Torres Williams
(74) *Attorney, Agent, or Firm* — Curatolo Sidoti & Trillis Co., LPA; Salvatore A. Sidoti; Floyd Trillis, III

(57) ABSTRACT

A flywheel configured to couple to a manual transmission to an unrelated vehicle engine. Also disclosed is a method for retrofitting a manual transmission with an unrelated vehicle engine. Also provided is a flywheel comprising a removable friction region and/or a removable gear portion.

24 Claims, 5 Drawing Sheets

FLYWHEEL

TECHNICAL FIELD

The present disclosure relates to flywheels, methods for retrofitting a manual transmission of a vehicle with an unrelated vehicle engine with the flywheel, and kits for retrofitting a manual transmission that include the flywheel.

BACKGROUND

A flywheel is an integral part of an automobile that provides contact between the crankshaft of an engine and the clutch assembly of the manual transmission and enables the engine to run smoothly. Manual transmission automobiles come equipped with either a dual-mass or single-mass flywheel.

Dual-mass flywheels are two separate pieces joined together by a pair of springs. These springs provide progressive tension which allows the dual-mass flywheel to dampen vibrations and reduce wear on the manual transmission. While dual-mass flywheels allow for better reduction in vibration than current single-mass flywheels, they are also more expensive to produce and less durable. Dual-mass flywheels are also prone to having a build-up of heat because the friction region is only attached to the engine side of the flywheel through a bearing that does not allow heat to be spread away from the friction region efficiently. Dual-mass flywheels are also difficult and costly to repair or refurbish. As such, flywheels are typically replaced in their entirety.

Single-mass flywheels are manufactured as integral solid pieces that reduce engine vibrations through increased inertia and allow for an engine to have a higher revolution per minute than dual-mass flywheels. Single-mass flywheels are more durable and efficiently dissipate heat, unlike the dual-mass flywheel counterpart. Because single-mass flywheels are integral solid pieces, they are also less costly to manufacture.

There is an increased trend of wanting to transplant an unrelated internal combustion engine into an automobile. Typically, a user wanting to retrofit an engine with an unrelated manual transmission would have to undertake an expensive and time-consuming process to either convert the flywheel from single-mass to dual-mass, or vice versa, or to custom fabricate an adaptor or connection piece that allows the engine and manual transmission to operate collectively. Utilizing the adaptor or connection pieces is time consuming and not cost effective as it involves the use of various components and each of the components must be properly aligned.

Accordingly, there is a long felt need in the art for a flywheel that enables a user to efficiently and cost effectively pair an unrelated engine with a manual transmission. This is especially true when the manual transmission originally utilized a dual-mass flywheel. Because of the defects described above in connection with dual-mass flywheels, a flywheel capable of being a single, integral piece having a single-mass configuration with a thickness capable of being altered depending on the particular pairing of the manual transmission with the unrelated engine is desired. In some instances, the single-mass flywheel will have substantially identical thickness to that of a dual-mass configuration. Because of the thickness increasing from a standard single-mass flywheel, there is also a desire for the single-mass flywheel to be lighter in weight because the more weight a flywheel has, more energy must be expended to increase the speed of the automobile.

There is also a desire to replace certain components of a flywheel due to wear and tear that are currently not replaceable, namely, the friction region and/or the gear portion.

When replacing a clutch in a manual transmission, often, a user will also be required to replace the entire flywheel due to wear on the flywheel that leaves hot spots on the side used in connection with the clutch. These hot spots on the flywheel can lead to unwanted vibration, rattling, or complete failure of the flywheel. This complete replacement is an expensive undertaking. Accordingly, there is a long felt need for a flywheel that enables a user to simply replace the friction region of a flywheel without having to replace the entire flywheel.

The gear teeth on a flywheel assist in starting the internal combustion engine by engaging with the engine's starter motor and turning the crankshaft. These gear teeth can chip, crack, or be worn down over time. When this happens, the entire flywheel must be replaced, thus incurring an inordinate cost. Accordingly, there is a long felt need for a flywheel that enables a user to simply replace the gear portion without having to replace the entire flywheel.

SUMMARY

Provided is a flywheel configured to couple a manual transmission of a vehicle to an unrelated engine comprising a substantially circular body having an outer periphery and opposite facing first and second sides with a sidewall extending therebetween. There is a first pattern of apertures extending through a portion of the body configured to attach the flywheel to the unrelated engine and a second pattern of apertures extending through at least a portion of the body configured to attach the flywheel to a clutch assembly. A gear portion is positioned about the outer periphery of the body.

Additionally provided is a method for retrofitting a manual transmission with an unrelated internal combustion engine of a vehicle, the method comprising the steps of removing an old flywheel from a motor vehicle having a manual transmission; and coupling the flywheel disclosed above with a crankshaft of an unrelated internal combustion engine and the clutch assembly of the manual transmission of the vehicle.

Additionally provided is a flywheel configured to couple a manual transmission to an engine of a vehicle, the flywheel comprising a substantially circular body having an outer periphery and opposite facing first and second sides, wherein a gear portion comprises a ring having a plurality of gear teeth disposed about is removably attached about the outer periphery of the body. A first pattern of apertures extends through the body and is configured to attach the flywheel to a crankshaft of the engine and a second pattern of apertures extend through at least a portion of the body and is configured to attach the flywheel to a clutch assembly of the manual transmission.

Additionally provided is a flywheel configured to couple a manual transmission to an engine of a vehicle, the flywheel comprising a substantially circular body having an outer periphery and opposite facing first and second sides, wherein the first side opposite facing side has a friction region removably attached thereto. A first pattern of apertures extends through the body and is configured to attach the flywheel to a crankshaft of the engine. A second pattern of apertures extend through at least a portion of the body and is configured to attach the flywheel to a clutch assembly of the manual transmission. A plurality of gear teeth are disposed about the outer periphery of the body.

Additionally provided is a flywheel configured to couple a manual transmission to an engine of a vehicle, the flywheel comprising a substantially circular body having an outer periphery and opposite facing first and second sides, a gear portion comprising a ring having a plurality of gear teeth disposed about removably attached about the outer periphery of the body, wherein the first side opposite facing side has at least one friction region removably attached thereto, a first pattern of apertures extending through the body and configured to attach the flywheel to a crankshaft of the engine, and a second pattern of apertures extending through at least a portion of the body and configured to attach the flywheel to a clutch assembly of the manual transmission.

BRIEF DESCRIPTION OF THE DRAWINGS

The present disclosure will be more readily understood from the detailed description of illustrative embodiments presented below considered in conjunction with the drawings, of which.

DETAILED DESCRIPTION

Figure 1:
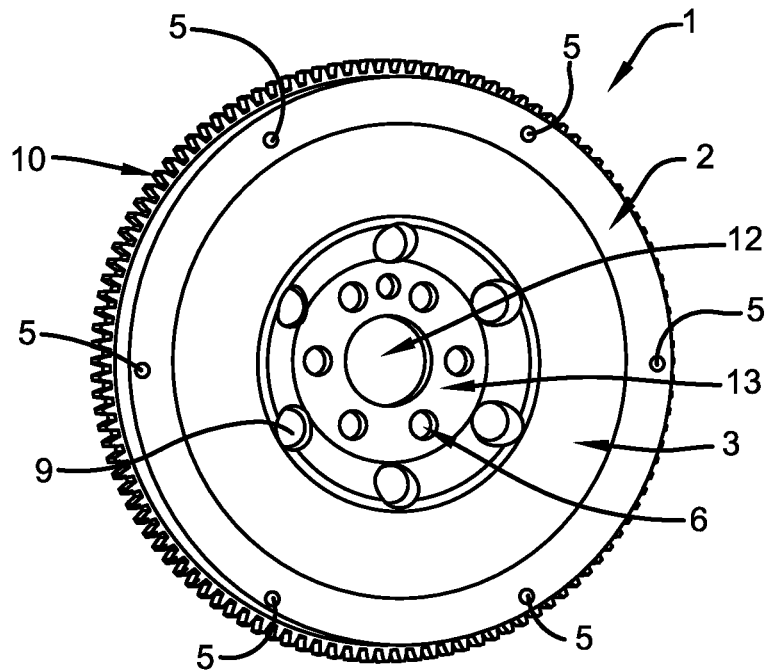
FIG. 1 is a perspective view of a first side (2) of an illustrative flywheel (1) configured to attach to a clutch assembly (not shown) connected to the input shaft of a gearbox (not shown).

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step, or methodology described herein can be deleted, combined with, or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

As used herein, the term "unrelated engine" means (i) that the engine and manual transmission were produced by different manufacturers, or (ii) the engine and manual transmission were produced for different makes of automobile, or (iii) the engine and manual transmission were produced for same make of automobile, but for a different model of the automobile, or (iv) the engine and manual transmission were produced for the same make and model of automobile, but different model years of production for the engine and manual transmission.

As used herein, the terms "about," and "substantially," and any other version thereof, or any other similar relative term, or similar term of approximation, are defined as being close to as understood by one having ordinary skill in the art.

According to certain embodiments, the "gear portion" disclosed herein may be in the shape of a ring (ie, "ring-shaped"). The gear portion has a plurality of gear teeth disposed about the ring and may be integral with and carried by the gear ring. The number of gear teeth in the plurality will vary depending on the particular engine and ignition involved in starting the automobile. In particular embodiments, the gear portion is removable. This enables a user to replace the gear portion as needed, without needing to replace the entire flywheel body.

Disclosed is a flywheel that is configured to couple a manual transmission of a vehicle to an unrelated engine. The flywheel has a substantially circular body having an outer periphery and opposite facing first and second sides with a sidewall that extends between the first and second opposite facing sides. The flywheel body includes a first pattern of apertures that extend through an inner portion of the flywheel body and is configured to attach the flywheel to the unrelated engine. The flywheel includes a second pattern of apertures that extend through at least a portion of the flywheel body and is configured to attach the flywheel to a clutch assembly of a manual transmission of the vehicle. A gear portion is positioned about the outer periphery of the body and is removably attached to the flywheel body. The body comprises an integral single-mass configuration.

In some embodiments, the single-mass configuration is configured to have a cross-sectional thickness substantially identical or identical to the thickness of a dual-mass flywheel. It is understood that the cross-sectional thickness of the single-mass flywheel can be altered depending on the spatial requirements for coupling the manual transmission to the unrelated engine of a specific vehicle.

According to certain illustrative embodiments, the flywheel further includes at least one additional aperture extending through the flywheel body for the purpose of reducing the overall mass of the flywheel. According to further illustrative embodiments, the flywheel body includes a third pattern of apertures extending through the body of the flywheel to reduce the overall mass of the flywheel. According to yet further illustrative embodiments, the third pattern of apertures comprises a substantially circular pattern of apertures.

According to certain illustrative embodiments, the flywheel body may comprise metals, metal alloys, and composites. According to certain embodiments, the flywheel body comprises a steel alloy. According to other embodiments, the flywheel body comprises aluminum. According to other embodiments, the flywheel body comprises a carbon fiber composite.

According to certain illustrative embodiments, the unrelated engine of the vehicle is an internal combustion engine. In certain embodiments, the manual transmission of the vehicle has an earlier date of manufacture than the unrelated engine. In certain embodiments, the unrelated engine has an earlier date of manufacture than the manual transmission.

According to certain illustrative embodiments, the manual transmission of the vehicle has a date of manufacture in the range from 1981 to 2003 and the unrelated engine has a date of manufacture in the range from 2004 to 2015. According to these embodiments, the unrelated engine may be, but is not limited to, a BMW N52 engine. According to these embodiments, the manual transmission may be selected from, but limited to, a BMW e30 transmission, a BMW e36 transmission, a BMW e46 transmission, or a BMW z3 transmission.

According to certain illustrative embodiments, the first opposite facing side of the flywheel includes at least one friction region. According to certain illustrative embodiments, the flywheel may include more than one friction region removably attached to the flywheel body. Without limitation, the friction region of the flywheel may be provided in the shape of a ring. According to certain embodiments, the at least one friction ring is planar or substantially planar. According to further embodiments, the flywheel may include more than one friction region with both friction regions being provided in the shape of a ring. According to further illustrative embodiments, the flywheel may include a first friction region in the shape of a ring and a second friction region in the shape of a ring with both the first and second friction rings attached to the first opposite facing side of the flywheel body. According to certain illustrative embodiments, the flywheel comprises a first friction ring and a second friction ring that are each removably attached to the first opposite facing side of the flywheel body, wherein the first friction ring has an inner diameter that is greater than the outer diameter of the second friction ring and the first and second friction rings are removably attached to the first opposite facing side of the flywheel body in a concentric pattern. According to certain illustrative embodiments, the flywheel comprises a first friction ring and a second friction ring that are each removably attached to the first opposite facing side of the flywheel body, wherein the first friction ring has an inner diameter that is greater than the outer diameter of the second friction ring and the first and second friction rings are removably attached to the first opposite facing side of the flywheel body in a concentric pattern, and wherein the first and second friction rings are concentrically spaced with a gap between the inner circumference of the first friction ring and the outer circumference of the second friction ring. Without limitation, any only by way of illustration, the friction region of the flywheel body is raised about 1 mm or less from the first opposite facing surface, or from about 0.5 mm or less from the first opposite facing surface, or from about 0.25 mm or less from the first opposite facing surface. According to certain embodiments, the friction region may be raised to about 1 mm from the face of the first opposite facing side of the flywheel body. According to alternative embodiments, the friction region may be flush with the first opposite facing side of the flywheel body. In certain embodiments, the first opposite facing side of the flywheel body has a friction region that is removably attached to the body. This enables the owner or a repair technician to replace only the friction region without needing to replace the entire flywheel body.

According to certain illustrative embodiments, a pin member is utilized to align the flywheel body at top dead center of the engine of the vehicle. The alignment of the flywheel body at top dead center of the engine enables proper engine ignition timing.

According to certain embodiments, the flywheel weight will vary depending on the particular pairing of the manual transmission and the unrelated engine.

Also disclosed is a kit for use in retrofitting a manual transmission with an unrelated engine of a vehicle. According to certain embodiments, the kit includes the flywheel disclosed herein, a clutch disc, a pressure plate and hardware for attaching the flywheel to the manual transmission and unrelated engine of the vehicle. The kit may also include instructions for the disassembly of the existing flywheel from the vehicle and the installation of the flywheel disclosed herein.

Also disclosed is a method for retrofitting a manual transmission of a vehicle with an unrelated engine. The method comprises the steps of removing an old flywheel from a motor vehicle having a manual transmission and coupling the flywheel disclosed herein to a crankshaft of the unrelated engine and the clutch assembly of the manual transmission the vehicle.

According to certain embodiments, the kit includes a flywheel body having a substantially circular body having an outer periphery and opposite facing first and second sides. A first pattern of apertures extends through the body and is configured to attach the flywheel to the crankshaft of an engine. A second pattern of apertures extends through at least a portion of the body and is configured to attach the flywheel to a clutch assembly of the manual transmission. The body of the flywheel includes a gear portion that is removably attached about the outer periphery of the flywheel body. According to certain embodiments, the removable gear portion comprises a continuous ring that includes a plurality of gear teeth positioned about the ring. The plurality of gear teeth of the continuous gear ring extend radially outwardly from the ring.

According to certain illustrative embodiments, the gear ring of the flywheel may comprise metals, metal alloys, and composites. According to certain embodiments, the gear ring comprises a steel alloy. According to other embodiments, the gear ring comprises aluminum. According to other embodiments, the gear ring comprises a carbon fiber composite. The material used to manufacture the gear ring of the flywheel may be the same or different as the material used to manufacture the flywheel body.

According to certain illustrative embodiments, the embodiments of the flywheel having a removably attached gear portion also has a third pattern of apertures extending through the body of the flywheel. The purpose of this third pattern of apertures is to reduce the overall mass of the flywheel.

According to certain embodiments, the embodiments of the flywheel having a removably attached gear portion comprises a single-mass configuration. In other embodiments, the flywheel comprises a dual-mass configuration. In other embodiments, the flywheel body comprises a single-mass configuration having a thickness substantially identical to the thickness of a dual-mass flywheel body.

According to certain embodiments, the embodiments of the flywheel having a removably attached gear portion also has a removably attached friction region positioned on the first opposite facing side of the flywheel body. Without limitation, any only by way of illustration, the friction region of the flywheel body is raised about 1 mm or less from the first opposite facing surface, or from about 0.5 mm or less from the first opposite facing surface, or from about 0.25 mm or less from the first opposite facing surface. According to certain embodiments, the friction region may be raised to about 1 mm from the face of the first opposite facing side of the flywheel body. According to alternative embodiments, the friction region may be flush with the first opposite facing side of the flywheel body. In certain embodiments, the first opposite facing side of the flywheel body has a friction region that is removably attached to the body.

According to certain illustrative embodiments, the flywheel comprises a substantially circular body having an outer periphery and opposite facing first and second sides. The first opposite facing side of the flywheel body includes a removable friction region. A first pattern of apertures extend through the body and are configured to attach the flywheel to a crankshaft of the engine of the vehicle. A second pattern of apertures extend through at least a portion of the body and are configured to attach the flywheel to a clutch assembly of the manual transmission. The flywheel also has a gear portion positioned about the outer periphery of the flywheel body.

The kit may include at least one friction component for removal attachment to the first opposite facing side of the flywheel to create at least one friction region. According to certain illustrative embodiments, the flywheel may include more than one friction component for removal attachment to the flywheel body to create more than one friction region that is removably attached to the flywheel body. Without limitation, the friction component of the flywheel may be provided in the shape of a ring. According to certain embodiments, the at least one friction ring is planar or substantially planar. According to further embodiments, the kit may include more than one friction component for removable attachment to the flywheel body with both friction components being provided in the shape of a ring. According to further illustrative embodiments, the kit may include a first friction component in the shape of a ring and a second friction component in the shape of a ring with both the first and second friction rings configured for removable attachment to the first opposite facing side of the flywheel body. According to certain illustrative embodiments, the flywheel kit comprises a first friction ring and a second friction ring that are each configured for removable attachment to the first opposite facing side of the flywheel body, wherein the first friction ring has an inner diameter that is greater than the outer diameter of the second friction ring and the first and second friction rings are configured for removable attachment to the first opposite facing side of the flywheel body in a concentric pattern. According to certain illustrative embodiments, the flywheel kit comprises a first friction ring and a second friction ring that are each configured for removable attachment to the first opposite facing side of the flywheel body, wherein the first friction ring has an inner diameter that is greater than the outer diameter of the second friction ring and the first and second friction rings are configured for removable attachment to the first opposite facing side of the flywheel body in a concentric pattern, and wherein the first and second friction rings are configured to be concentrically spaced with a gap between the inner circumference of the first friction ring and the outer circumference of the second friction ring. Without limitation, any only by way of illustration, the friction region of the flywheel body is raised about 1 mm or less from the first opposite facing surface, or from about 0.5 mm or less from the first opposite facing surface, or from about 0.25 mm or less from the first opposite facing surface. According to certain embodiments, the friction region may be raised to about 1 mm from the face of the first opposite facing side of the flywheel body. According to alternative embodiments, the friction region may be flush with the first opposite facing side of the flywheel body. In certain embodiments, the first opposite facing side of the flywheel body has a friction region that is removably attached to the body. This enables the owner or a repair technician to replace only the friction region without needing to replace the entire flywheel body.

According to certain illustrative embodiments, the friction region of the flywheel may comprise metals, metal alloys, and composites. According to certain embodiments, the friction region comprises a steel alloy. According to other embodiments, the friction region comprises aluminum. According to other embodiments, the friction region comprises a carbon fiber composite. The material used to manufacture the friction region of the flywheel may be the same or different as the material used to manufacture the flywheel body.

In certain embodiments, the embodiments of the flywheel having a removable friction region also has a third pattern of apertures extending through the body of the flywheel. The purpose of this third pattern of apertures is to reduce the overall mass of the flywheel.

In some embodiments, the embodiments of the flywheel having a removable friction region is a single-mass configuration. In other embodiments, the flywheel is a dual-mass configuration. In other embodiments, the flywheel is a single-mass configuration having a thickness substantially identical to the thickness of a dual-mass flywheel.

In some embodiments, the embodiments of the flywheel having a removable friction region also has a removable gear portion.

Also disclosed is a kit for use in replacing a flywheel in an automobile having a manual transmission. The kit can comprise for example, but is not limited to, the flywheel having a removable friction component to create a friction region on the first opposite face of the flywheel body, a clutch disc, and a pressure plate.

Also disclosed is a kit for use in replacing a flywheel in an automobile having a manual transmission. The kit can comprise for example, but is not limited to, the flywheel disclosed herein having both a removable gear portion and a removable friction component to create a friction region on the flywheel body once removably attached thereto, a clutch disc, and a pressure plate.

FIG. 1 shows first side (2) of an illustrative flywheel (1) configured to attach to a clutch assembly (not shown). The first side (2) of the flywheel (1) has a flat annular contact friction region (3) configured to removably engage with a clutch disc (not shown). Gear portion (10) is positioned on the outer periphery of a second side (not shown) of flywheel (1). Gear portion (10) is configured to engage an ignition system (not shown) of an automobile, such that gear portion (10) and the ignition system work together to ignite or start the engine of an automobile. First side (2) of flywheel (1) has apertures (5) positioned near the outer periphery of flywheel (1) for mounting a clutch assembly (not shown) to flywheel (1). Apertures (5) do not extend through the entire thickness of flywheel (1). Flywheel (1) also includes an inner annular recessed portion (13) having apertures (6) which allow for the passage of bolts or other mechanical affixing means on an engine block when mounting flywheel (1) to a crankshaft (not shown). Apertures (9) reduce the mass of flywheel (1). Central aperture (12) is positioned in inner annular recessed portion (13) of flywheel (1) and allows for the passage of a crankshaft therethrough.

Figure 2:
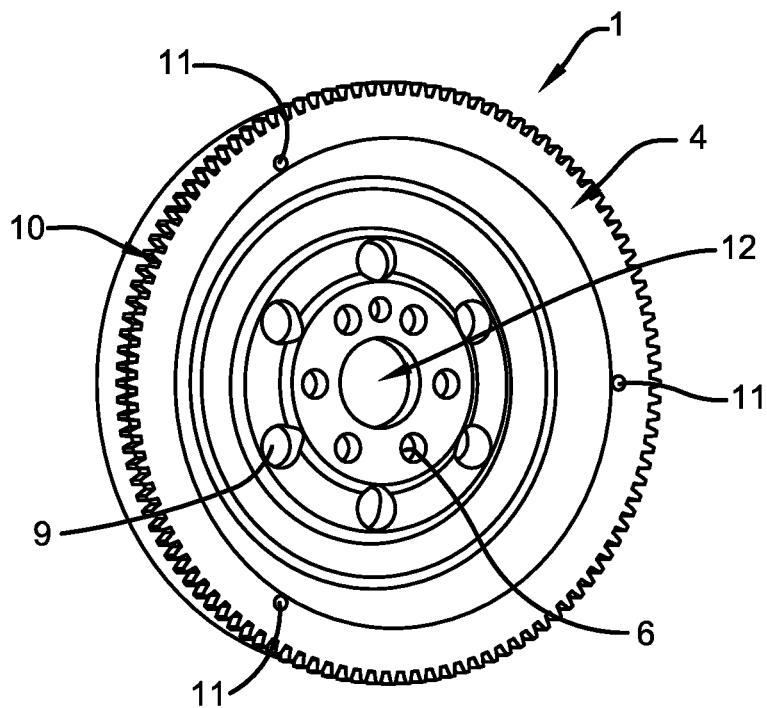
FIG. 2 is a perspective view of a second side (4) of the FIG. 1 flywheel (1) configured to mount to the end of a crankshaft (not shown) of an internal combustion engine (not shown).

FIG. 2 shows a second side (4) of the FIG. 1 flywheel (1) configured to mount to the end of a crankshaft (not shown) of an automobile engine (not shown). Gear portion (10) is positioned on the outer periphery of second side (4) of flywheel (1). Gear portion (10) is configured to engage an ignition system of an automobile, such that the gear portion (10) and the ignition system work together to ignite or start the engine of an automobile. Apertures (9) reduce the mass of flywheel (1). Central aperture (12) of flywheel (1) allows for the passage of crankshaft therethrough. Apertures (11) are configured to engage a locking tool that enables a user to lock the engine at top dead center.

Figure 3:
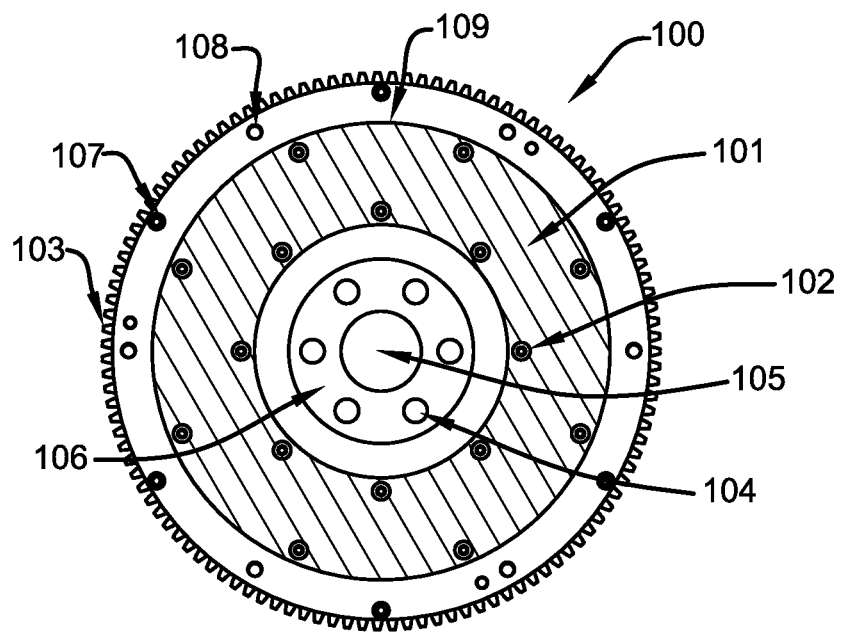
FIG. 3 is a perspective view of a first side (109) of another illustrative flywheel (100) configured to attach to a clutch assembly (not shown).

FIG. 3 shows a first side (109) of another illustrative flywheel (100) configured to attach to a clutch assembly (not shown). First side (109) of flywheel (100) has a flat annular contact friction region (101) configured to removably engage with a clutch disc (not shown). Gear portion (103) is positioned on the outer periphery of a second side (not shown) of flywheel (100). Gear portion (103) is configured to engage an ignition system of an automobile, such that the gear portion (103) and ignition system work together to ignite or start the engine of an automobile. First side (109) of flywheel (100) has apertures (107) positioned near the outer periphery of flywheel (100) for mounting a clutch assembly (not shown) to flywheel (100). Apertures (107) do not extend through the entire thickness of flywheel (100). Flywheel (100) also includes an inner annular portion (106) having apertures (104) which allow for the passage of bolts on an engine block when mounting flywheel (100) to a crankshaft. Central aperture (105) positioned in inner annular portion (106) of flywheel (100) allows for the passage of crankshaft therethrough. Apertures (102) positioned on flat annular contact friction region (101) are configured to receive bolts or other mechanical fastening means to couple (101) within recessed portion of flywheel (100). Apertures (108) positioned near outer periphery of flywheel (100) are configured to receive mechanical fasteners to couple gear portion (103) to body portion (120) of flywheel (100).

Figure 4:
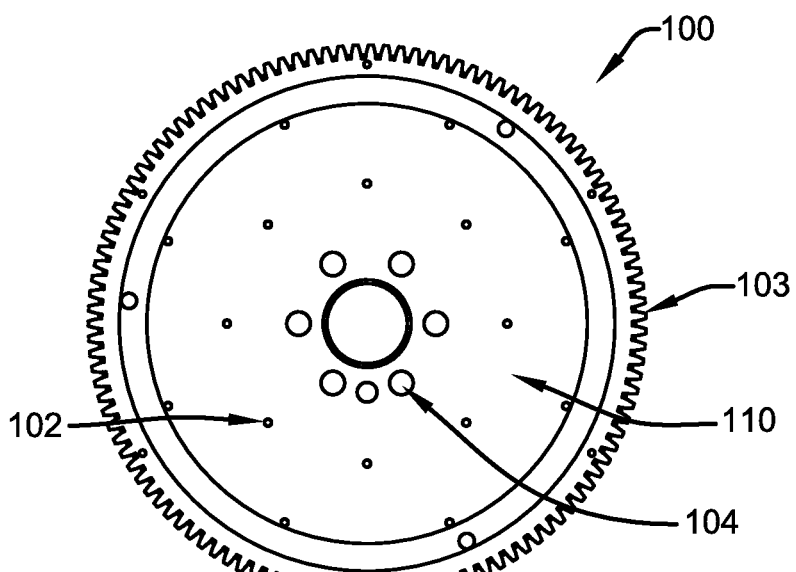
FIG. 4 is a perspective view of a second side (110) of the FIG. 3 flywheel (100) configured to mount to the end of a crankshaft (not shown) of an internal combustion engine (not shown).

FIG. 4 shows a second side (110) of the FIG. 3 flywheel (100) configured to mount to the end of a crankshaft (not shown) of an automobile engine (not shown). Gear portion (103) is positioned on the outer periphery of a second side (11) of flywheel (100). Central aperture (105) allows for the passage of crankshaft therethrough. Flywheel (100) also includes apertures (104) which allow for the passage of bolts or other mechanical fastening means on an engine block when mounting flywheel (100) to a crankshaft. Apertures (102) positioned on body portion (120) align with apertures (102) on flat annular contact friction region on first side (109) of flywheel (100) as shown in FIG. 3.

Figure 5:
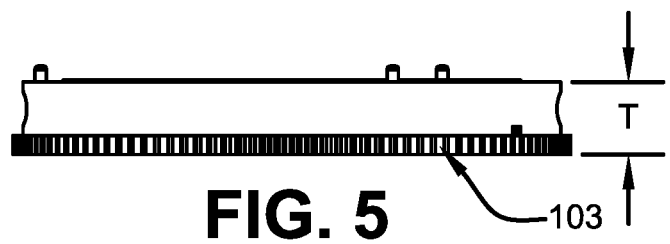
FIG. 5 is a side view of the FIGS. 3 and 4 flywheel (100).

FIG. 5 shows a side view of the FIGS. 3 and 4 flywheel (100). The flywheel (100) has first side (109) and second side (110). Gear portion (103) is positioned on the outer periphery of a second side (110) of flywheel (100). Thickness "T" of flywheel (100) is shown.

Figure 6:
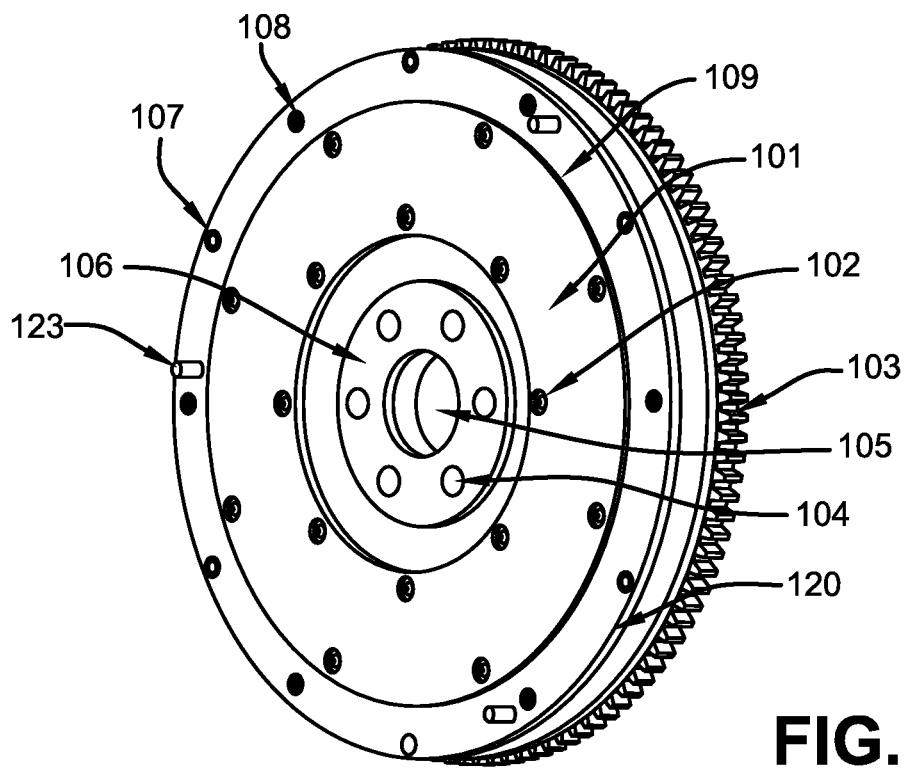
FIG. 6 is a perspective view of a first side (109) of the FIG. 3 flywheel (100).

FIG. 6 shows first side (109) of the FIG. 3 flywheel (100) configured to attach to a clutch assembly (not shown). First side (109) of flywheel (100) has a flat annular contact friction region (101) configured to removably engage with a clutch disc (not shown). Gear portion (103) is positioned on the outer periphery of a second side (not shown) of flywheel (100). Gear portion (103) is configured to engage an ignition system of an automobile, such that the gear portion (103) and ignition system work together to ignite or start the engine of an automobile. First side (109) of flywheel (100) has apertures (107) positioned near the outer periphery of flywheel (100) for mounting a clutch assembly (not shown) to flywheel (100). Apertures (107) do not extend through the entire thickness of flywheel (100). Flywheel (100) also includes an inner annular portion (106) having apertures (104) which allow for the passage of bolts on an engine block when mounting flywheel (100) to a crankshaft. Central aperture (105) positioned in inner annular portion (106) of flywheel (100) allows for the passage of crankshaft therethrough. Apertures (102) positioned on flat annular contact friction region (101) are configured to receive bolts or other mechanical fastening means to couple (101) within recessed portion of flywheel (100). Apertures (108) positioned near outer periphery of flywheel (100) are configured to receive mechanical fasteners to couple gear portion (103) to body portion (120) of flywheel (100). Pegs (123) extend outwardly from first side (109) of flywheel (100).

Figure 7:
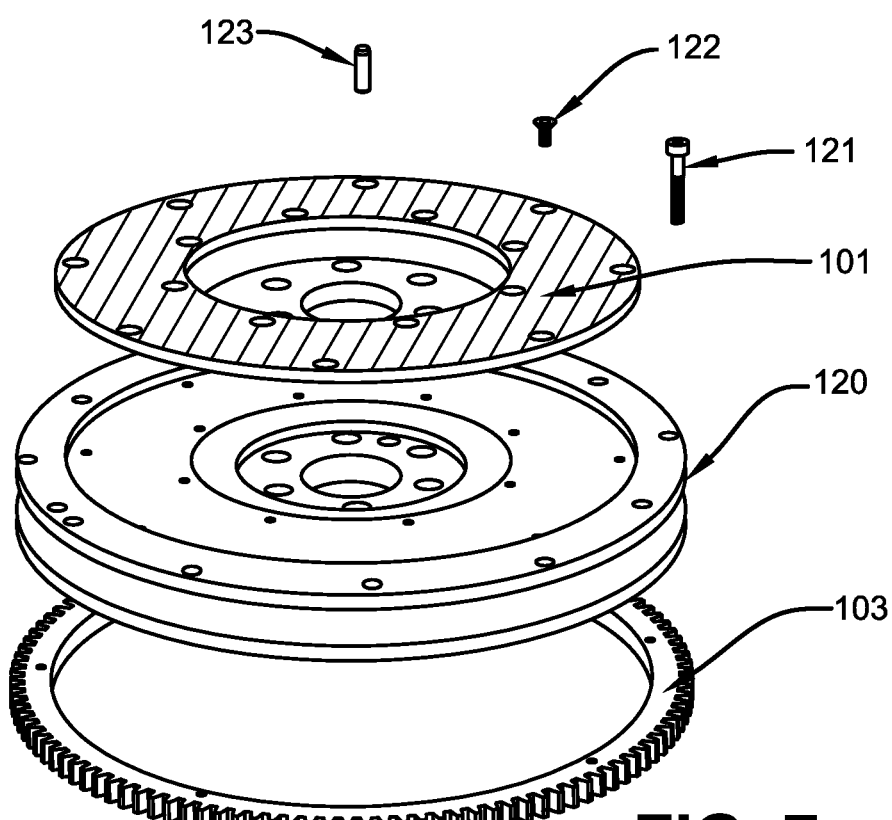
FIG. 7 is a perspective view of the illustrative flywheel (100) of FIG. 3.

FIG. 7 shows an exploded view of the flywheel (100) of FIG. 3, wherein the flat annular contact friction region (101) is removed from body portion (120) of flywheel (100). Gear portion (103) is also removed from body portion (120) of flywheel (103). Mechanical fastening means (121, 122) connect flat annular contact friction region (101) to body portion (120) of flywheel (100). Peg (123) extends outwardly from first side (109) of flywheel (100).

Figure 8:
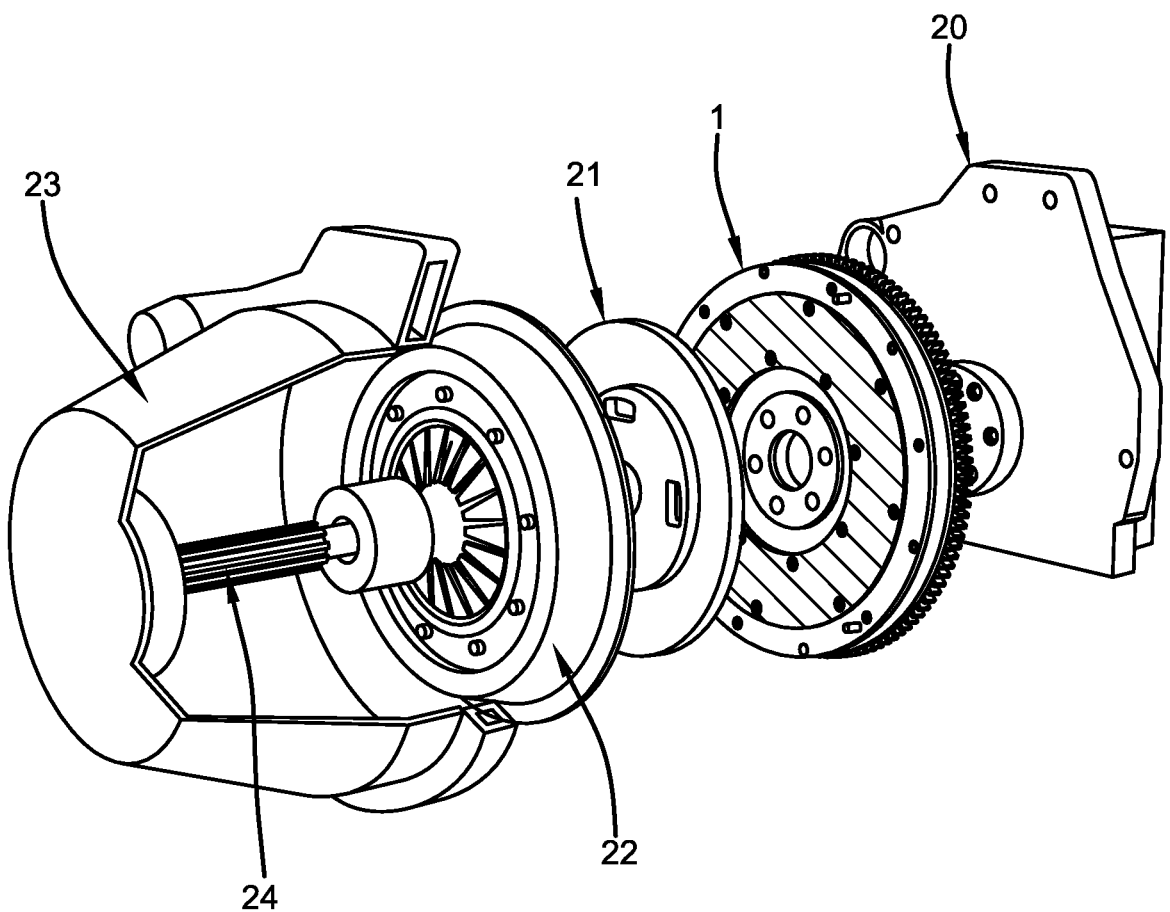
FIG. 8 is a schematic diagram of an engine block (20), flywheel (1), clutch disc (21), pressure plate (22), bell housing (23), and input shaft of a gearbox (24).

FIG. 8 shows a schematic diagram of an engine block (20), flywheel (1), clutch disc (21), pressure plate (22), bell housing (23), and input shaft of gearbox (24).

Figure 9A:
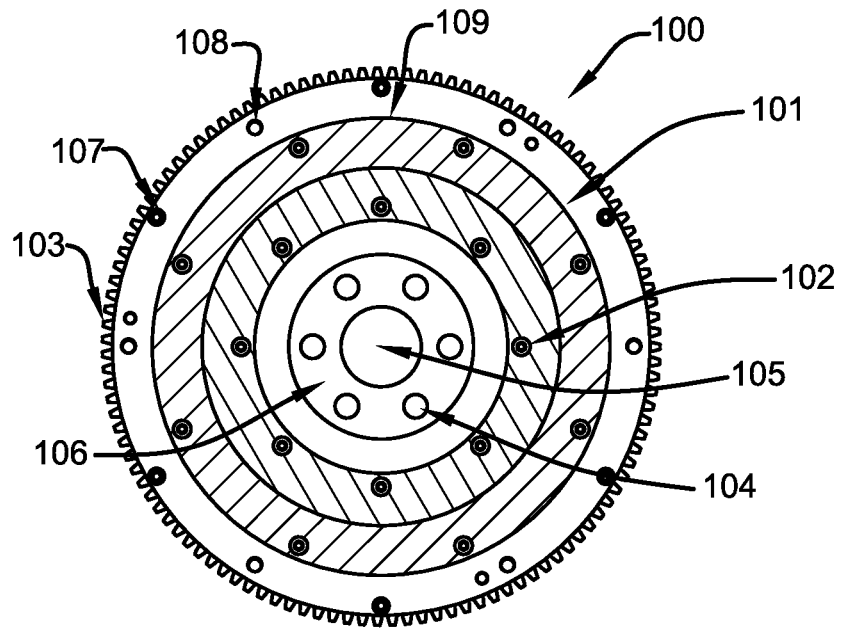
FIG. 9A is a perspective view of a first side (109) of another illustrative flywheel (100) configured to attach to a clutch assembly (not shown).

FIG. 9A shows a first side (109) of another illustrative flywheel (100) configured to attach to a clutch assembly (not shown). First side (109) of flywheel (100) has a flat annular contact friction region (101) having a first friction planar ring and a second friction planar ring, such that each are removably attached to the first opposite facing side of the flywheel body. The first friction planar ring has an inner diameter that is greater than the outer diameter of the second friction planar ring. The first and second friction planar rings are removably attached in a concentric pattern. Gear portion (103) is positioned on the outer periphery of a second side (not shown) of flywheel (100). Gear portion (103) is configured to engage an ignition system of an automobile, such that the gear portion (103) and ignition system work together to ignite or start the engine of an automobile. First side (109) of flywheel (100) has apertures (107) positioned near the outer periphery of flywheel (100) for mounting a clutch assembly (not shown) to flywheel (100). Flywheel (100) also includes an inner annular portion (106) having apertures (104) which allow for the passage of bolts on an engine block when mounting flywheel (100) to a crankshaft. Central aperture (105) positioned in inner annular portion (106) of flywheel (100) allows for the passage of crankshaft therethrough. Apertures (102) positioned on flat annular contact friction region (101) are configured to receive bolts or other mechanical fastening means to couple (101) within recessed portion of flywheel (100). Apertures (108) positioned near outer periphery of flywheel (100) are configured to receive mechanical fasteners to couple gear portion (103) to body portion (120) of flywheel (100).

Figure 9B:
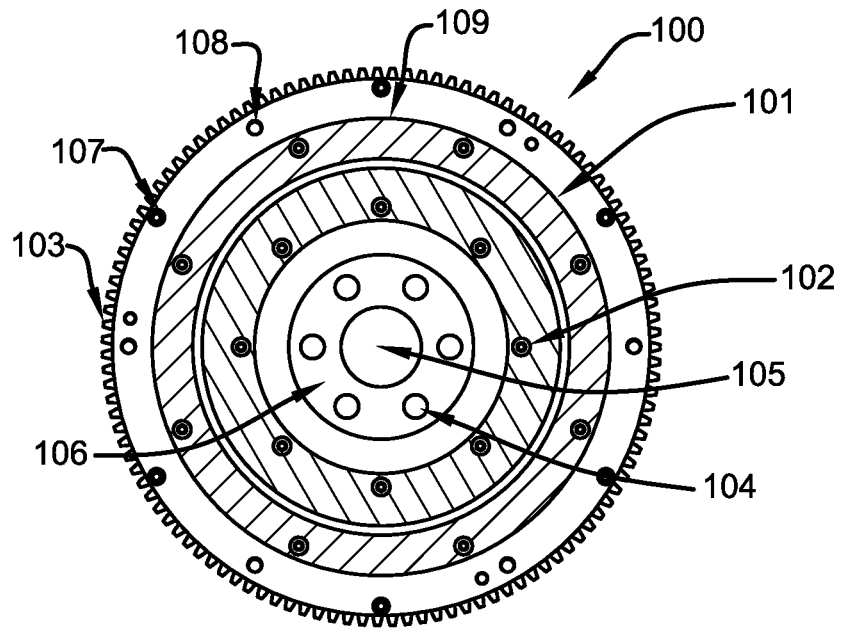
FIG. 9B is a perspective view of a first side (109) of another illustrative flywheel (100) configured to attach to a clutch assembly (not shown).

FIG. 9B shows a first side (109) of another illustrative flywheel (100) configured to attach to a clutch assembly (not shown). First side (109) of flywheel (100) has a flat annular contact friction region (101) having a first friction planar ring and a second friction planar ring, such that each are removably attached to the first opposite facing side of the flywheel body. The first friction planar ring has an inner diameter that is greater than the outer diameter of the second friction planar ring. The first and second friction planar rings are removably attached in a concentric pattern, with a concentrically spaced gap between the inner circumference of the first friction planar ring and the outer circumference of the second friction planar ring. Gear portion (103) is positioned on the outer periphery of a second side (not shown) of flywheel (100). Gear portion (103) is configured to engage an ignition system of an automobile, such that the gear portion (103) and ignition system work together to ignite or start the engine of an automobile. First side (109) of flywheel (100) has apertures (107) positioned near the outer periphery of flywheel (100) for mounting a clutch assembly (not shown) to flywheel (100). Flywheel (100) also includes an inner annular portion (106) having apertures (104) which allow for the passage of bolts on an engine block when mounting flywheel (100) to a crankshaft. Central aperture (105) positioned in inner annular portion (106) of flywheel (100) allows for the passage of crankshaft therethrough. Apertures (102) positioned on flat annular contact friction region (101) are configured to receive bolts or other mechanical fastening means to couple (101) within recessed portion of flywheel (100). Apertures (108) positioned near outer periphery of flywheel (100) are configured to receive mechanical fasteners to couple gear portion (103) to body portion (120) of flywheel (100).

It is understood that the exemplary embodiments are merely illustrative of the disclosure and that many variations of the above-described embodiments can be derived by one skilled in the art without departing from the scope of the disclosure. It is therefore intended that all such variations be included within the scope of the following claims and their equivalents.

The invention claimed is:

1. A flywheel configured to couple a manual transmission of a motor vehicle to an unrelated engine, the flywheel comprising:
   a substantially circular body having an outer periphery and opposite facing first and second sides with a sidewall extending between the first and second opposite facing sides;
   a first pattern of apertures extending through a portion of the body configured to attach the flywheel to the unrelated engine;
   a second pattern of apertures not extending through the entire thickness of the body configured to attach the flywheel to a clutch assembly of the manual transmission; and
   a gear portion disposed about the outer periphery of the body.

2. The flywheel of claim 1, wherein the body comprises metals, metal alloys, and composites.

3. The flywheel of claim 1, wherein the unrelated engine is an internal combustion engine.

4. The flywheel of claim 1, wherein the manual transmission of the motor vehicle has an earlier date of manufacture than the unrelated engine.

5. The flywheel of claim 4, wherein the manual transmission of the motor has a date of manufacture ranging from 1981 to 2003, and wherein the unrelated engine has a date of manufacture ranging from 2004 to 2015.

6. The flywheel of claim 5, wherein the unrelated engine comprises a BMW N52 engine.

7. The flywheel of claim 5, wherein the manual transmission of the motor vehicle is selected from the group consisting of: a BMW e30 transmission, a BMW e36 transmission, a BMW e46 transmission, or a BMW z3 transmission.

8. The flywheel of claim 1, wherein the gear portion is removably attached to the flywheel body.

9. The flywheel of claim 1, wherein the first opposite facing side of the body has at least one friction region attached thereto.

10. The flywheel of claim 9, wherein the at least one friction region is removably attached to the first opposite facing side of the body.

11. The flywheel of claim 10, wherein the at least one friction region is a substantially planar ring.

12. The flywheel of claim 11, wherein the at least one friction region comprises more than one friction region.

13. The flywheel of claim 12, wherein the at least one friction region comprises a first friction region in the shape of a planar ring and a second friction region in the shape of a planar ring with both the first and second friction rings removably attached to the first opposite facing side of the flywheel body.

14. The flywheel of claim 13, wherein the at least one friction region comprises a first friction planar ring and a second friction planar ring that are each removably attached to the first opposite facing side of the flywheel body, wherein the first friction ring has an inner diameter that is greater than the outer diameter of the second friction ring and the first and second friction rings are removably attached to the first opposite facing side of the flywheel body in a concentric pattern.

15. The flywheel of claim 13, wherein the at least one friction region comprises a first friction planar ring and a second friction planar ring that are each removably attached to the first opposite facing side of the flywheel body, wherein the first friction planar ring has an inner diameter that is greater than the outer diameter of the second friction planar ring and the first and second friction rings are removably attached to the first opposite facing side of the flywheel body in a concentric pattern, and wherein the first and second friction planar rings are concentrically spaced with a gap between the inner circumference of the first friction planar ring and the outer circumference of the second friction planar ring.

16. The flywheel of claim 9, wherein the friction region is raised about 1 mm or less from the first opposite facing surface.

17. A kit for use in retrofitting a manual transmission of a motor vehicle with an unrelated engine, the kit comprising the flywheel of claim 1, a clutch disc, and a pressure plate.

18. A method for retrofitting a manual transmission of a motor vehicle with an unrelated engine, the method comprising:
   removing an old flywheel from the motor vehicle having a manual transmission; and
   coupling the flywheel of claim 1 to a crankshaft of the unrelated engine and the clutch assembly of the manual transmission.

19. A flywheel configured to couple a manual transmission of a motor vehicle to an unrelated engine, the flywheel comprising:
   a substantially circular body having an outer periphery and opposite facing first and second sides with a sidewall extending between the first and second opposite facing sides, wherein the first opposite facing side of the body has at least one friction region attached thereto, and wherein the at least one friction region is raised about 1 mm or less from the first opposite facing side;
   a first pattern of apertures extending through a portion of the body configured to attach the flywheel to the unrelated engine;
   a second pattern of apertures extending through at least a portion of the body configured to attach the flywheel to a clutch assembly of the manual transmission; and
   a gear portion disposed about the outer periphery of the body.

20. A method for retrofitting a manual transmission of a motor vehicle with an unrelated engine, the method comprising:
- removing an old flywheel from the motor vehicle having a manual transmission; and
- coupling the flywheel of claim 19 to a crankshaft of the unrelated engine and the clutch assembly of the manual transmission.

21. A flywheel configured to couple a manual transmission of a motor vehicle to an unrelated engine, the flywheel comprising:
- a substantially circular body having an outer periphery and opposite facing first and second sides with a sidewall extending between the first and second opposite facing sides;
- wherein the first opposite facing side of the body has at least one friction region removably attached thereto, the at least one friction region comprises a first friction region in the shape of a substantially planar ring and a second friction region in the shape of a substantially planar ring with both the first and second friction regions removably attached to the first opposite facing side of the body in a concentric pattern;
- a first pattern of apertures extending through a portion of the body configured to attach the flywheel to the unrelated engine;
- a second pattern of apertures extending through at least a portion of the body configured to attach the flywheel to a clutch assembly of the manual transmission; and
- a gear portion disposed about the outer periphery of the body.

22. A method for retrofitting a manual transmission of a motor vehicle with an unrelated engine, the method comprising:
- removing an old flywheel from the motor vehicle having a manual transmission; and
- coupling the flywheel of claim 21 to a crankshaft of the unrelated engine and the clutch assembly of the manual transmission.

23. A flywheel configured to couple a manual transmission of a motor vehicle to an unrelated engine, the flywheel comprising:
- a substantially circular body having an outer periphery and opposite facing first and second sides with a sidewall extending between the first and second opposite facing sides;
- wherein the first opposite facing side of the body has at least one friction region removably attached thereto, the at least one friction region comprises a first friction region in the shape of a substantially planar ring and a second friction region in the shape of a substantially planar ring with both the first and second friction regions removably attached to the first opposite facing side of the body in a concentric pattern, and wherein the first and second friction regions are concentrically spaced with a gap between the inner circumference of the first friction region and the outer circumference of the second friction region;
- a first pattern of apertures extending through a portion of the body configured to attach the flywheel to the unrelated engine;
- a second pattern of apertures extending through at least a portion of the body configured to attach the flywheel to a clutch assembly of the manual transmission; and
- a gear portion disposed about the outer periphery of the body.

24. A method for retrofitting a manual transmission of a motor vehicle with an unrelated engine, the method comprising:
- removing an old flywheel from the motor vehicle having a manual transmission; and
- coupling the flywheel of claim 23 to a crankshaft of the unrelated engine and the clutch assembly of the manual transmission.

* * * * *